US010060802B1

(12) United States Patent
Ragosta et al.

(10) Patent No.: US 10,060,802 B1
(45) Date of Patent: Aug. 28, 2018

(54) INTELLIGENT DIGITAL THERMOMETER

(71) Applicants: Summer Merie Ragosta, Winters, CA (US); Kristina Ragosta Arnoux, Wakefield, RI (US)

(72) Inventors: Summer Merie Ragosta, Winters, CA (US); Kristina Ragosta Arnoux, Wakefield, RI (US)

(*) Notice: Subject to any disclaimer, the term of this patent is extended or adjusted under 35 U.S.C. 154(b) by 365 days.

(21) Appl. No.: 14/558,599

(22) Filed: Dec. 2, 2014

Related U.S. Application Data

(60) Provisional application No. 61/963,328, filed on Dec. 2, 2013.

(51) Int. Cl.
*A61B 5/01* (2006.01)
*G08C 19/00* (2006.01)
*G01K 13/00* (2006.01)
*G01K 1/02* (2006.01)

(52) U.S. Cl.
CPC ............ *G01K 13/002* (2013.01); *G01K 1/02* (2013.01)

(58) Field of Classification Search
CPC .................. G01J 5/00; A61B 10/0012; A61B 2010/0019; A61B 5/01; A61B 5/0022; A61B 5/4306; G01K 13/002; G01K 1/022; G01K 13/004
USPC ................................................. 600/474, 549
See application file for complete search history.

(56) References Cited

U.S. PATENT DOCUMENTS

| | | | |
|---|---|---|---|
| 3,729,998 A | 5/1973 | Mueller | |
| 4,377,171 A | 3/1983 | Wada | |
| 4,475,158 A * | 10/1984 | Elias | A61B 10/0012 374/E13.002 |
| 4,488,560 A * | 12/1984 | Takamura | A61B 5/01 600/549 |
| 4,771,791 A | 9/1988 | Kubouchi | |
| 4,833,689 A * | 5/1989 | Nakanishi | G01K 13/002 374/163 |
| 4,878,184 A | 10/1989 | Okada | |

(Continued)

FOREIGN PATENT DOCUMENTS

| | | | |
|---|---|---|---|
| CN | 2539962 | * | 3/2003 |
| CN | 2634450 Y | * | 8/2004 |

(Continued)

*Primary Examiner* — Gail Kaplan Verbitsky
(74) *Attorney, Agent, or Firm* — Fish & Richardson P.C.

(57) ABSTRACT

A digital thermometer includes a housing having a measurement tip, a user interface control to receive input from a user, a display for displaying temperature measurements, a data connector for insertion into a compatible port on an external device, and various components inside the housing including a temperature sensor, a wired/wireless communications unit, a controller to control operation of the thermometer based on the device software and input received from the user, and a memory storing temperature measurements, device software relating to control of the thermometer, and user software relating to instructions to be executed by the external device. Upon detecting that a communication link has been established between the thermometer and the external device, the user software is uploaded to the external device, and is caused to install and execute. Thereafter, temperature measurements are uploaded from the thermometer's memory to the user software on the external device.

1 Claim, 7 Drawing Sheets

(56) References Cited

U.S. PATENT DOCUMENTS

| | | | | |
|---|---|---|---|---|
| 4,901,186 | A * | 2/1990 | Tennant | H02H 5/042 338/22 R |
| 4,930,222 | A | 6/1990 | Nakanishi | |
| 5,137,028 | A * | 8/1992 | Nishimura | A61B 10/0012 600/551 |
| 5,632,555 | A | 5/1997 | Gregory | |
| 5,657,762 | A * | 8/1997 | Coley | A61B 10/0012 600/549 |
| 5,914,271 | A * | 6/1999 | Law | A61B 10/0012 436/164 |
| 6,146,015 | A | 11/2000 | Weiss | |
| 6,342,839 | B1 * | 1/2002 | Curkendall | A01K 11/007 340/5.8 |
| 6,351,217 | B1 * | 2/2002 | Kuhn | G01K 13/002 340/573.1 |
| 6,773,726 | B2 * | 8/2004 | Sweazy | A23L 33/30 424/670 |
| 6,837,618 | B1 | 1/2005 | Yamamoto | |
| 7,161,463 | B2 * | 1/2007 | Kawaguchi | C08G 61/12 338/25 |
| 8,540,644 | B2 * | 9/2013 | Husheer | A61B 5/0008 374/100 |
| 9,069,408 | B2 * | 6/2015 | Hotelling | G06F 3/0416 |
| 9,330,046 | B2 * | 5/2016 | Keegan | G06F 13/4081 |
| 9,757,511 | B2 * | 9/2017 | Adamczyk | A61M 5/14244 |
| 2002/0176479 | A1 * | 11/2002 | Hur | G01J 5/04 374/131 |
| 2004/0228929 | A1 * | 11/2004 | Sweazy | A23L 33/30 424/682 |
| 2005/0028172 | A1 * | 2/2005 | Yoshikawa | G06F 9/4415 719/321 |
| 2005/0149663 | A1 * | 7/2005 | Dorny | G06F 1/3203 711/101 |
| 2005/0154327 | A1 | 7/2005 | Nakazawa | |
| 2006/0122473 | A1 * | 6/2006 | Kill | G01J 5/04 600/300 |
| 2007/0014328 | A1 * | 1/2007 | Weng | G01J 5/02 374/121 |
| 2007/0071066 | A1 * | 3/2007 | Weng | G01J 5/02 374/163 |
| 2007/0118405 | A1 * | 5/2007 | Campbell | A61B 5/14532 705/2 |
| 2007/0191729 | A1 * | 8/2007 | Park | A61B 5/01 600/551 |
| 2007/0276283 | A1 * | 11/2007 | Hung | A61B 10/0012 600/551 |
| 2008/0269571 | A1 * | 10/2008 | Brown | G06F 19/3418 600/300 |
| 2009/0287094 | A1 * | 11/2009 | Ferren | A61B 5/026 600/481 |
| 2010/0152606 | A1 | 6/2010 | Menashe | |
| 2011/0158284 | A1 * | 6/2011 | Goto | A61B 5/0008 374/163 |
| 2012/0057615 | A1 * | 3/2012 | Weng | G01J 5/049 374/128 |
| 2012/0063487 | A1 * | 3/2012 | Albrecht | A61B 5/01 374/128 |
| 2012/0238900 | A1 * | 9/2012 | Rechberg | A61B 5/01 600/549 |
| 2013/0054115 | A1 * | 2/2013 | Chen | F02D 41/144 701/104 |
| 2013/0215928 | A1 * | 8/2013 | Bellifemine | G01J 5/0022 374/121 |
| 2013/0275076 | A1 * | 10/2013 | Yildizyan | A61B 5/01 702/131 |
| 2014/0064333 | A1 * | 3/2014 | Roth | G01K 1/028 374/170 |
| 2014/0274240 | A1 * | 9/2014 | Meadows | A63F 13/216 463/3 |
| 2015/0055681 | A1 * | 2/2015 | Tsuchida | G01K 7/427 374/183 |
| 2015/0133744 | A1 * | 5/2015 | Kobayashi | A61B 10/0012 600/301 |
| 2015/0289768 | A1 * | 10/2015 | Toriumi | G01K 13/002 340/588 |
| 2016/0037755 | A1 * | 2/2016 | Webster | G06F 19/322 600/304 |
| 2016/0066894 | A1 * | 3/2016 | Barton-Sweeney | A61B 5/02055 600/301 |
| 2016/0156271 | A1 * | 6/2016 | Nishijima | H02M 3/33523 363/21.12 |
| 2016/0174946 | A1 * | 6/2016 | Sacks | A61B 10/0012 702/19 |
| 2016/0210262 | A1 * | 7/2016 | Keegan | G06F 13/4081 |
| 2016/0270768 | A1 * | 9/2016 | Kersken | A61B 10/0012 |
| 2017/0030781 | A1 * | 2/2017 | Pompei | G01K 13/002 |

FOREIGN PATENT DOCUMENTS

| | | | | |
|---|---|---|---|---|
| CN | 202104911 U | * | 1/2012 | |
| CN | 106606354 A | * | 5/2017 | |
| GB | 0608829 | * | 6/2006 | A61B 5/0008 |
| JP | 2003069666 A | * | 3/2003 | |
| JP | 2011067293 A | * | 4/2011 | |
| WO | WO 8702876 A2 | * | 5/1987 | A61B 10/0012 |

* cited by examiner

INTELLIGENT DIGITAL THERMOMETER

RELATED APPLICATION

This application claims priority to U.S. Provisional Application No. 61/963,328, filed Dec. 2, 2013, which is incorporated herein in its entirety.

BACKGROUND

This application relates to an intelligent digital thermometer, e.g., for measuring, recording, and/or charting a person's body temperature. One potentially useful application of taking body temperature measurements is to monitor a women's basal body temperature ("BBT"), which is generally defined as the lowest body temperature attained during rest (usually during sleep). BBT is generally measured immediately after awakening and before any physical activity has been undertaken, although the temperature measured at that time is somewhat higher than the true basal body temperature (see FIG. 1, which shows an example of a biphasic basal body temperature chart). In women, ovulation causes an increase of one-half to one degree Fahrenheit (one-quarter to one-half degree Celsius) in BBT; monitoring of BBT is one way of estimating the day of ovulation. The tendency of a woman to have lower temperatures before ovulation, and higher temperatures afterwards, is known as a biphasic pattern. Charting of this pattern may be used as a component of fertility awareness. Accordingly, a women seeking fertility awareness may find it productive to measure her BBT once a day over a period of several days, chart the measurements on a graph and then examine the resulting charts to determine whether an increase in BBT is indicated.

SUMMARY

In one aspect, an intelligent digital thermometer, and/or a method of using same, includes one or more of the following features.

In one aspect, a digital thermometer includes a housing having a tip configured to be placed at a location on a human body at which a temperature measurement is to be taken, a user interface control disposed on the housing and operable to receive input from a user of the digital thermometer, a display disposed on the housing and configured to display information, including temperature measurements, to the user of the digital thermometer, a data connector disposed on the housing and configured for insertion into a compatible data port on an external device, and disposed inside the housing, components including (i) a temperature sensor configured to take temperature measurements at the tip of the digital thermometer, (ii) a memory storing device software and user software, and configured to store additional information including temperature measurements, wherein the device software comprises instructions relating to control of the digital thermometer, and wherein the user software comprises instructions to be executed on and by the external device, (iii) a communications unit configured to enable wired or wireless communication between the digital thermometer and the external device, (iv) a controller configured to control operation of the digital thermometer based on the device software stored in the memory and input received from the user of the digital thermometer, wherein execution of the device software by the controller causes the controller to perform operations including: (a) take temperature measurements and store the measurements in the memory, (b) detect that a communication link has been established between the digital thermometer and the external device, (c) in response to the detection, upload the user software from the digital thermometer's memory to the external device, (d) subsequent to the upload, cause the external device to install and execute the user software, and (e) upload the temperature measurements from the digital thermometer's memory to the user software executing on the external device The user software may include instructions that, upon execution by the external device, cause the external device to automatically generate a graph (e.g., a biphasic body temperature chart) of the uploaded temperature measurements upon receipt of the temperature measurements.

The user software may include instructions that, upon execution by the external device, cause a user interface to be presented on a display screen associated with the external device.

The user software may include instructions that, upon execution by the external device, cause the external device to perform an analysis of the uploaded temperate measurements, including temperature pattern recognition or pattern deviation recognition, or both.

The device software may be configured to enable the thermometer to be used with a plurality of different users such that a separate user profile is maintained for each different user.

The device software may be configured to provide an alarm to the user to prompt the user to take a body temperature measurement.

The device software may be configured to generate temperature measurement information in a format that conforms to an Electronic Health Records standard defined in 45 Code of Federal Regulations Part 107.

The device software may be configured to display a menstrual cycle chart on the thermometer's display.

The device software may include instructions that, when executed by the controller, cause the thermometer's display to display a plurality of user selectable icons, each user selectable icon corresponding to a different user interface control. The plurality of user selectable icons may include the following: a first icon relating to initiating a temperature measurement instance, a second icon relating to initiating a communication session between the digital thermometer and the external device, a third icon relating to an alarm function to alert the user to initiate a temperature measurement instance, and a fourth icon relating to a temperature charting function.

The digital thermometer further may include a camera.

In another aspect, a method performed by a digital thermometer includes receiving temperature measurements from a temperature sensor, storing the received temperature measurements in a memory, detecting a trigger condition to transmit the temperature measurements to an external device, causing user software to begin executing on the external device, and upload the stored temperature measurements to the external device.

The method may further include, prior to receiving the temperature measurements, receiving user input identifying a user of the thermometer, and storing the received temperature measurements in a user profile associated with the identified user.

Detecting the trigger condition may include detecting that a communication link exists between a communication unit associated with the thermometer and the external device, and/or may include detecting user input indicating a desire to transmit the temperature measurements to the external device.

The detected communication link may include a wireless communication link or a wired communication link.

The method may further include, prior to causing the user software to begin executing on the external device, determining that the user software is not installed on the external device, uploading the user software to the external device, and causing the user software to be installed on the external device.

The method of may further include determining an operating mode of the digital thermometer, including one of a basal mode and a core mode, and if the operating mode is determined to be the basal mode: (i) performing a basal accuracy check by calculating a difference between a current time and a closest reminder alarm time, and determining that the calculated difference is less than a predetermined value, (ii) receiving user information indicating that the user has started her menstrual cycle, (iii) associating a current temperature measurement with a start of a new menstrual cycle, and (iv) storing the current temperature measurement and information relating to the association in the memory. If the operating mode is determined to be the core mode, the method displays a measured temperature in a display of the digital thermometer.

The user software, when executed on the external device, may be configured to automatically generate a biphasic body temperature chart in response to receiving the temperature measurements from the thermometer.

The user software, when executed on the external device, may be configured to automatically perform an analysis of the uploaded temperate measurements, including temperature pattern recognition or pattern deviation recognition, or both.

The device and methods described here may provide one or more of the following potential advantages. For example, compared to conventional devices and techniques, the thermometer described here combines intelligent data sensing, data input, coding for multi-patient use and multiple readings/day, relatively big data storage, basic data analysis, associated software compatible with hospital Electronic Health Record (EHR) systems and/or home computers, and USB and/or wireless data transfer capabilities into one portable streamline unit (easily carried in a lab-coat pocket). Furthermore, the ability to produce this thermometer on a small or large scale using 3-D printer technology greatly reduces the overall cost, making it more accessible to the average consumer. When used in the health-care setting, an implementation of this thermometer allows input of data into the thermometer itself for multiple temperature reading episodes on multiple patients over time; the ability to instantaneously transmit this data to a hospital mainframe for the 2014 Electronic Medical Record (EMR) Federal Mandate compliance, or to a remote health care provider, represents an advance over conventional devices. The portability and data-storage technology also makes this an ideal instrument for health care providers in rural low-tech environments.

For personal at-home women users, the device may include associated software specific for basal body temperature charting that will automatically discard aberrant temp/time readings when the menstrual cycle graph is being generated (i.e. only one temperature/time reading per day, taken at the pre-set alarm time is used to generate the menstrual cycle graph for increased accuracy). The generated graph can be transferred electronically or printed out for analysis by the woman and her health care provider. This encourages data review between patient and health care provider, rather than providing only a (possibly errant) diagnosis directly to the patient (e.g., displaying a patient's current fertility status, or health condition), as conventional devices typically offer.

In general, the thermometer described here provides a portable and user-friendly tool to gather accurate health data by either a health care professional or by the patient themselves; the device logs this data and enables basic graphic and data output and transfer options so that patient health data can be transmitted to and reviewed by patient health care providers. In other words, it bridges the gap between patient health data and health care provider, and enables the patient to be an active part in his/her health data collections and interpretive discussions.

Details of one or more implementations are set forth in the accompanying drawings and the description below. Other features, objects, and potential advantages will be apparent from the description and drawings, and from the claims.

DESCRIPTION OF DRAWINGS

Like reference symbols in the various drawings indicate like elements.

DETAILED DESCRIPTION

Figure 1:
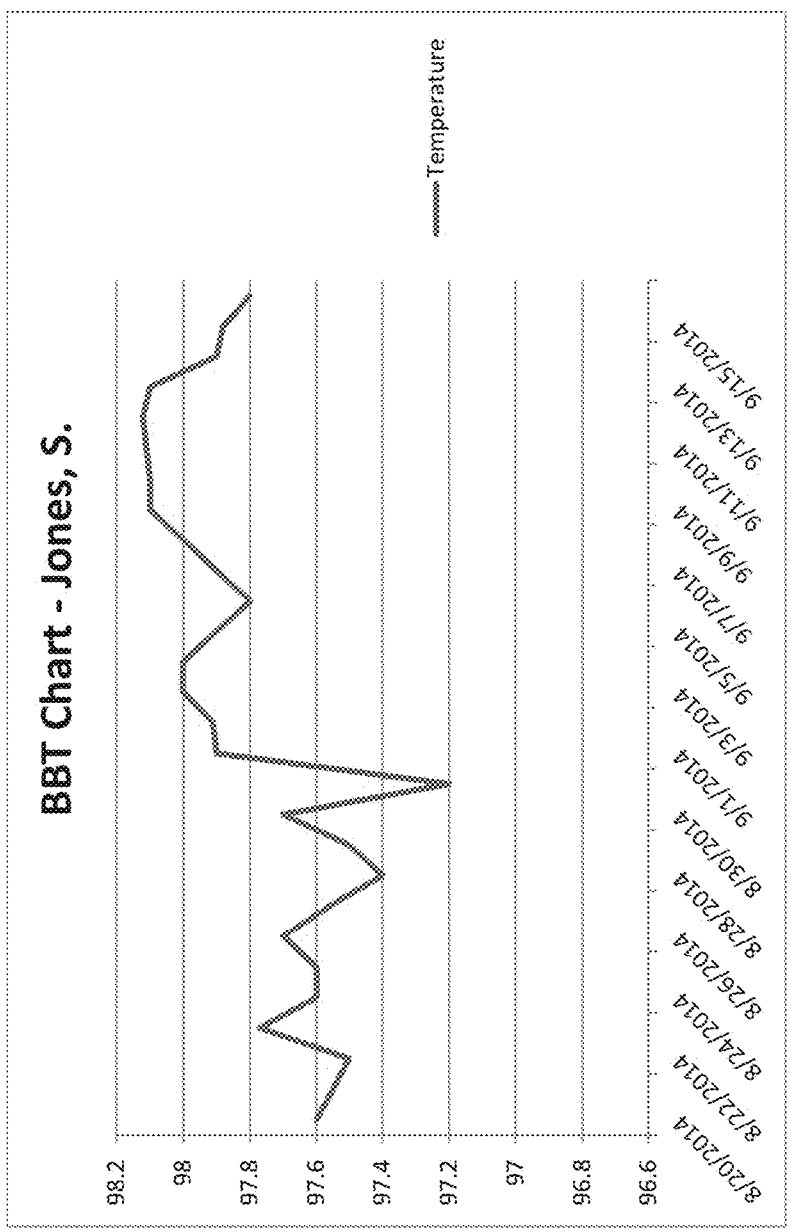
FIG. 1 shows an example of a biphasic body temperature chart.

As described herein, a "smart" digital thermometer having an imbedded microprocessor and high storage capacity, and which has a USB or other data connector and/or wireless communications (e.g., Bluetooth, WiFi, cellular), records and stores temperature data over time and automatically charts this data using a user-friendly computer software interface program running on a device (e.g., printer, plotter or computer) having a communications link with the thermometer. Additional functions may include, but are not limited to, data analyses (e.g., temperature pattern recognition, pattern deviation recognition), user alerts (e.g., repetitious patient coding, unusually high or low temperature reading), and/or an alarm function to notify the user to take a body temperature measurement.

Applications may include, but are not limited to, ambulatory temperature monitoring for immune-compromised patients, post-operative care, and people living with chronic disease, where a variation from normal body temperature patterns may be the first indication of a health problem that needs medical attention. Also, hospitals and health-care facilities nationwide are now moving towards "Electronic Medical Records, or "EMR" (equivalently, "Electronic Health Records," or "EHR"). The thermometer described here may be EMR-compliant (i.e., adheres to the standards and certification criteria established by the U.S. Department of Health and Human Services ("HHS") in order to ensure meaningful use by eligible providers and eligible hospitals participating in Medicare and Medicaid Incentive Programs), and thus would greatly assist the transition to digital patient-data records. A description of the HHS' EHR-compliance requirements is available at http://www.healthit.gov/policy-researchers-implementers/standards-certification-rules, and in 45 Code of Federal Regulations ("CFR") Part 170, which is incorporated herein by reference.

The streamlined portability and familiarity of the device design allows it to be used by health-care providers including but not limited to hospital and clinic physicians and nurses managing several patients throughout the course of a day, ambulance personnel and first responders, home-healthcare professionals, as well as by patients themselves to record and track temperature data over time. The recorded data can then become a permanent part of a patient's record by download, or instantly via wireless technology. Physicians (who may be remote from the patient) will be able to quickly see patterns and identify variations that may indicate additional or immediate patient attention is needed. Additionally, for personal home use, the woman consumer will be able to accurately record BBT readings that will then be automatically plotted onto a graph in order to establish menstrual cycle patterns that can be analyzed for fertility management.

In general, patient body temperature is monitored and recorded in a clinical setting by health care professionals such as nurses and physicians. Changes in core body temperature trends suggest changes in bodily functions, and may indicate a need for medical intervention. Also, accuracy in temperature measurements and documentation is a critical step in patient health care management. In general, improving the ability of healthcare practitioners to accurately capture, store, and share longitudinally derived patient health data in EHRs is one way to increase the quality of patient medical care. But electronic data capture ideally should be consistent, and factors such as ease of use and design can facilitate adherence to documentation guidelines and standards.

Additionally, patient safety relies on ensuring that health information is consistently and precisely associated with the patient to whom it pertains. In that regard, EHR systems should have alerts and prompts that notify the user when the potential for an incorrect association exists.

The thermometer described here addresses the above-noted concerns by providing a portable, familiar, easy to use "smart" device to accurately measure, store, code, and instantaneously transfer electronic patient health data. Furthermore, the device is able to store large amounts of data, e.g., 512 megabytes to 128 gigabytes, thereby enabling consistent and continuous multiple patient monitoring. One implementation of the device includes alerts to indicate inaccurate or duplicate patient coding and patient-data associations. The software associated with the device is compatible with Microsoft Windows SP3 through 8.1, Android, iOS, Debian, and Apple Macintosh operating systems, and major health care facility EHR mainframe systems, for example, an IBM system or equivalent running a Unix-type environment or the like.

Using a digital thermometer to measure basal body temperature with the purpose of creating a menstrual cycle chart requires taking temperature readings at the same time each day upon waking and before rising out of bed. Measurements need to be taken for several menstrual cycle periods in order to establish a pattern. The average rise in BBT in an ovulating woman is between 0.4 and 0.6 degrees, so basal thermometers need to be ultra-sensitive and accurate. The observed rise in temperature normally occurs after ovulation, with some women observing a small decrease in temperature just prior to ovulation. Most basal thermometer kits on the market include paper chart templates that the user can fill in manually.

Current research has shown that relying on basal body temperature charting for ovulation determination and prediction is unreliable because of problems in data accuracy and interpretation. Therefore, instruments such as thermometers and fertility monitors currently on the market claiming to determine fertility and time of ovulation may be misleading to women and/or delaying appropriate medical treatment for any undiagnosed fertility issues. The thermometer described here does not claim to determine or predict ovulation; rather it provides a tool for women to more accurately measure, record, and chart basal body temperature readings over time, and use the information as a visual aid for discussing any menstrual cycle patterns identified during evaluation by and with her medical care provider.

The thermometer may be implemented as a stand-alone device with a sensor to measure core human body temperature, and internal microprocessor with high-storage capacity and data transfer technology via USB and/or wireless "bluetooth." The device is portable and can be used wherever human body temperature monitoring is required.

Generally speaking, hospitals and other health care facilities need to improve the accuracy and accessibility of Electronic Health Record data capture, storage, and transfer. The thermometer, in various implementations, stores, transfers, and charts human body temperature digital data, facilitating health care industry compliance with the 2014 Federal Electronic Medical Record mandate. This high data storage-capacity portable digital thermometer device with a streamline USB design enables health care providers to accurately measure, record, and store multiple temperature data points each day over a period of many days; the data can then be uploaded onto a computer via the USB connector, or relayed to a computer immediately via wireless technology.

For personal home health and ambulatory care, the device provides a solution to patient vital sign monitoring and menstrual cycle charting inaccuracies by decreasing human error potential through reduction of the number of manual steps required to chart basal or core body temperature measurements over time. Core and basal body temperature longitudinal monitoring is used in healthcare to establish individual patient baseline data. Once baseline data has been established, continued monitoring can identify any increase or decrease in baseline temperatures, or shifts in basal body temperature patterns, which may indicate bodily function changes such as onset of infection, pregnancy or ovulation in women. Specific applications for a device to facilitate longitudinal temperature monitoring include post-operative care, fertility assessments, and chronic and acute illness monitoring and diagnoses. Furthermore, the batteries are re-chargeable via USB, enabling long-term use of the device.

As noted above, the digital thermometer described here has high storage capacity and uses USB and/or wireless "bluetooth" technology that records temperature data over time and automatically charts this data using a user-friendly computer software interface program. Woman consumers may use the device as a Natural Family Planning Method of fertility monitoring through the evaluation of a woman's basal body temperature shifts throughout her menstrual cycle. Basal body temperature readings can then be automatically plotted onto a graph in order to establish menstrual cycle patterns. This tool is intended to increase the accuracy of basal body temperature measurements by decreasing the human error variable during temperature reading measurements, in part via data storage capacity, and in part via alerting the user to take temperature at a set time each day with a pre-set alarm. The temperature/time data can then be evaluated with the woman's health care practitioner as an aid in fertility healthcare management.

Additional applications include, but are not limited to, tracking temperature at home for immune-compromised patients, people living with chronic disease, or for any person or health care provider using a normal body temperature pattern variation as one of the first indications of a change in bodily function or health status and need for medical attention. As noted above, hospitals and health-care facilities nationwide are now moving towards "Electronic Medical Records, or "EMR." The thermometer described here is EMR-compliant and would greatly assist the transition to digital patient health data records. The portability and familiarity of the device will allow it to be used by healthcare providers such as physicians, home-health-care nurses, and in-hospital professionals, as well as by the patients themselves to record and track temperature data over time. The recorded data could then become a permanent part of the patient's record by computer upload, or instantly transfer to a mainframe via wireless technology. Physicians (who may be remote from the patient) will then be able to quickly see patterns and identify variations that may indicate necessary additional or immediate patient attention. Also, the general consumer may select this device for the accuracy, high storage capacity, and re-chargeable battery function.

Figure 2:
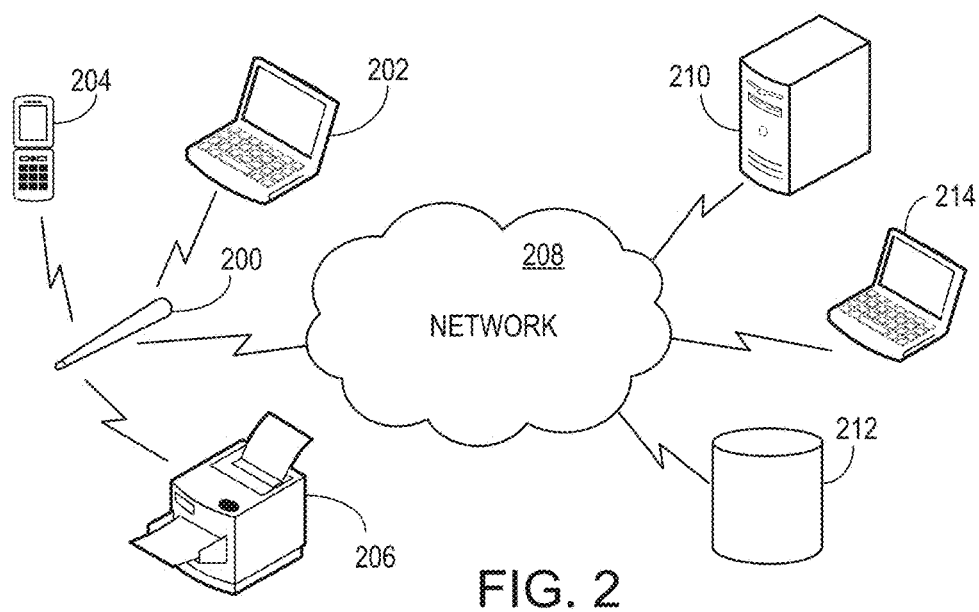
FIG. 2 is an overview diagram of an environment in which an intelligent digital thermometer may be used.

FIG. 2 is an overview diagram of an environment in which the body temperature charting thermometer may be used. As shown therein, the thermometer 200 is communicatively coupled (i.e., either by a direct wired connection, or wirelessly, or both) to any of several different entities, for example, a computer 202 (e.g., a notebook or workstation computer running a Windows, Apple Mac, or Unix operating system), a mobile device 204 (e.g., a smart phone or tablet running an Android or Apple iOS operating system), and/or a printing device 206 (e.g., a printer or plotter having wireless or networking capability). The thermometer 200 may also be connected to a network (e.g., the Internet or other packet-switched network), which would enable the thermometer to communicate directly with remote entities such as a server computer 210, a database 212, and/or a remote computer 214 associated, e.g., with a caregiver or other remote user (i.e., at a different physical location than the thermometer).

The environment shown in FIG. 2 provides great flexibility in the manner that thermometer 200 can be used. For example, a user of the thermometer 200 can cause the thermometer (by choosing appropriate setting and/or other programming of the device) to automatically transmit the user's measured temperature readings (e.g., either at a specified time of day or upon obtaining a specified quantity of temperature measurements) to that user's computer 202 and/or mobile device 204 for storage, analysis, and/or charting. Similarly, the thermometer 200 can automatically transmit the user's temperature readings to printing device 206 to generate a hard copy graph of that user's body temperature fluctuations over a specified period of time (e.g., 24 hours). Alternatively, or in addition, the thermometer 200 can communicate via network 208 to transmit the user's temperature readings (potentially along with other information uniquely identifying, and/or relating to, the user) to any or all of the server computer 210, database 212, or remote computer 214. This network-based communication capability may prove beneficial in a central station environment—that is, a central station run, e.g., by a healthcare organization, collects body temperature readings from multiple different patients, and stores them in a central database, and makes them subsequent available for review and analysis by authorized individuals (e.g., a care-giver associated with a particular patient).

Figure 3:
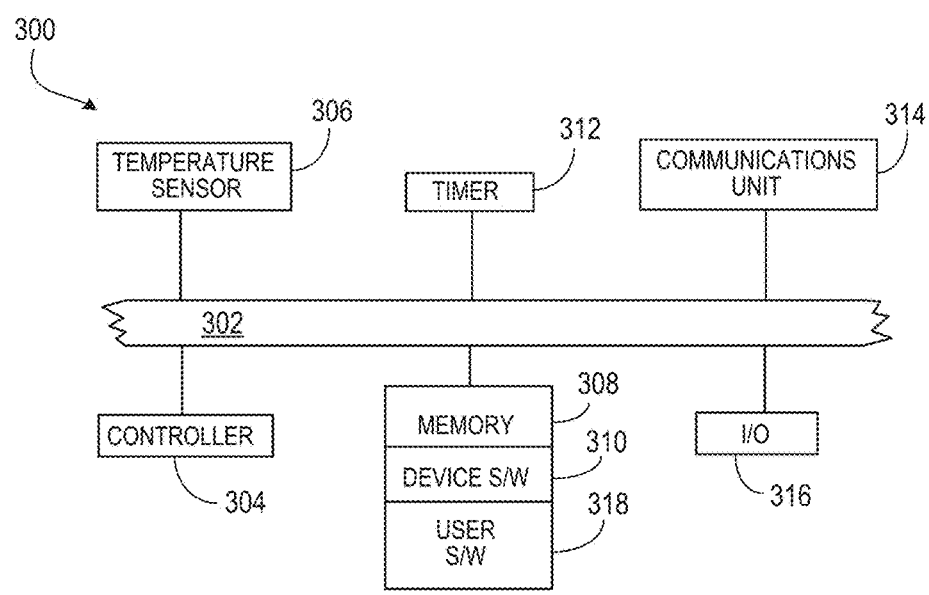
FIG. 3 is a block diagram of functional components of an intelligent digital thermometer.

FIG. 3 is a block diagram of functional components 300 of an intelligent digital thermometer. As shown therein, a system bus 302 (e.g., capable of communicating control, address, and data to each of the components 300) interconnects a controller 304 (e.g., a microprocessor or microcontroller), a temperature sensor 306, a timer 312, a communications unit 314, an Input/Output unit 316, and a memory unit 308, which has partition for storing device software 310 (which the controller 304 executes to control operation of the thermometer), and user software 318 (which is to be transmitted to, and executed by, an external device). (The thermometer also has a power source, such as a rechargeable battery, which is not shown in FIG. 3.) Based on the device software 310, the controller 304 controls overall operation of the thermometer, for example, by alerting the user to take a temperature measurement, and/or by causing temperature sensor 306 to take temperature readings at specified times, e.g., either predetermined times specified by the user or instantaneously when the user presses an appropriate button (as sensed and relayed by the I/O unit 316) indicating that she desires to take her temperature. The temperature readings are stored in memory 308, along with the date and time at which each reading was taken, and potentially along with information uniquely identifying the user. As noted above, the thermometer has the capability of being used by multiple different users, readings for each of whom may be stored persistently in the memory 308. The thermometer differentiates the users by maintaining, in memory 208, a different user profile for each different user. Whenever a temperature reading is to be taken, the user of the thermometer inputs information (via I/O 316) that identifies their corresponding user profile. In that manner, the subsequent temperature measurements can be stored in memory 308 in a manner that they are associated with the correct user profile, and thus the correct user, while maintaining logical separation from all other user's data.

The timer 312 is used for all clock, alarm, and time-keeping functions, for example, to time-stamp each temperature measurement, to provide alarms to a user that a predetermined time has arrived (meaning that the user is due to take a temperature measurement), and/or to cause the thermometer to transmit data to another device at a preset time.

The communications unit 314 includes both wired communications circuitry (e.g., a Universal Serial Bus (USB) port) and wireless communications circuitry (e.g., WiFi, Bluetooth, cellular) to enable the thermometer to communicate with external devices, e.g., such as those shown in FIG. 2.

The I/O unit 316 handles all interaction and direct communication between the user and the thermometer. For example, using an input device (such as buttons on the thermometer) and an output device (such as a LED screen on the thermometer), the user can interact with the thermometer to specify information such as user identity, trigger a temperature measurement or a data transfer, set an alarm for user notification, set a predetermined time for data transfer, or the like.

Figure 4A:
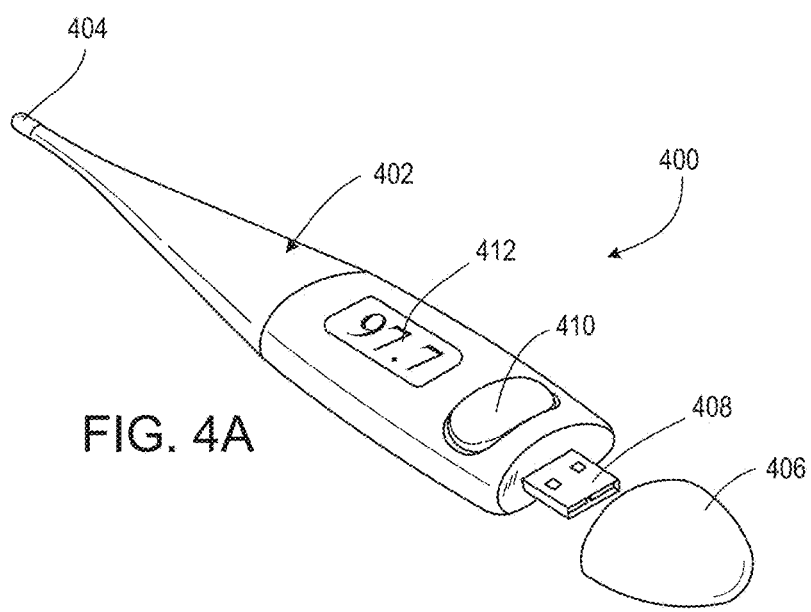
FIGS. 4A and 4B show alternative designs for an intelligent digital thermometer.
Figure 4B:
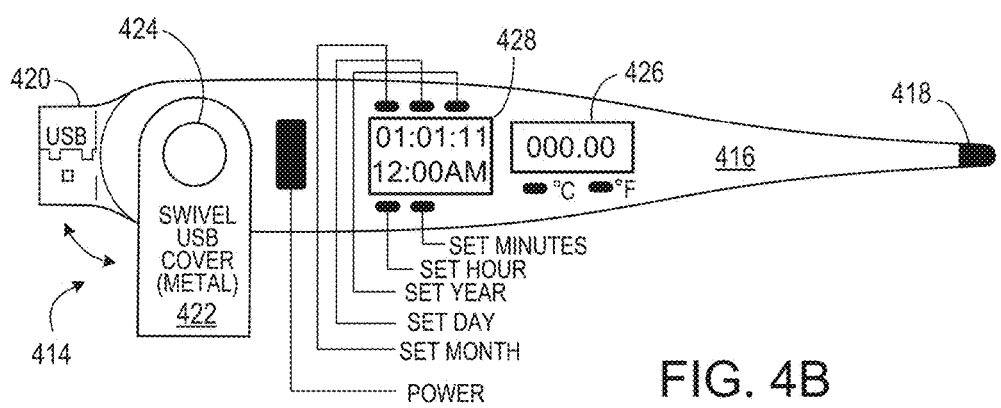

FIGS. 4A and 4B show alternative appearances of the thermometer, each having different I/O devices available to the user. In the configuration shown in FIG. 4A, the thermometer 400 includes a body or housing 402 having a tip 404 (the temperature taking end), and a cap 406, which conceals a USB port 408. In this configuration, the I/O devices include a single display window 412 and two input buttons 410, configured to receive input from a user of the thermometer (e.g., information relating to the user's identity, an instruction to start taking temperature measurements, etc.).

In contrast, in the configuration shown in FIG. 4B, the thermometer 414 includes a body or housing 416, a tip 418, a USB port 420 at an end opposite the tip 418, and a swivel cover 422 that rotates about pin 424 to conceal the USB port 420, when in the closed position. This configuration includes two display windows 426, 428, and eight input buttons (power, set month, set day, set year, set hour, set minute, C, F). In both designs, the thermometer's tip is designed to be placed at a location on a human body (e.g., underarm, mouth, ear, anus) at which temperature measurements are desired to be taken.

Transmission of stored temperature measurements can occur in any of several different manners. For example, a user can specify that upload of stored measurements can be transmitted to an external device at a predetermined date and time (or the same time each day, once a week, etc.). Similarly, stored measurements can be transmitted based on a quantity of measurements taken—for example, the user could specify that the stored measurements are to be transmitted every time 14 measurements have been taken and stored. Alternatively, stored measurements can be transmitted immediately in response to a button push by the user.

In any event, when the thermometer establishes communication with an external device (whether by wireless connection or by physical connection via USB), the thermometer can transmit the stored user software 318 to the external device, e.g., if the external device does not already have the user software 318 installed, and then cause it to be installed and launched. Alternatively, if the external device already has the user software 318 installed, then establishment of communication between the thermometer and the external device can simply cause the user software 318 to launch (i.e., begin executing) on the external device. Thereafter, the thermometer can transmit its stored temperature measurements to the external device, which will provide them to the executing user software 318, which in turn will process the received temperature measurements, for example, by storing them in an associated user profile, plotting the measurements in a graph (either display on the computer screen or printed as hard copy or both), and/or perform other analysis or processing. Examples of additional analyses or data processing might include repeated or inaccurate patient coding alerts, as well as temperature data pattern recognition (to create patient baseline information), and baseline pattern deviation recognition. In other words, once longitudinal temperature patterns have been established and recognized by the device software, aberrant data or deviant data patterns will trigger an alert function that may notify the user and/or health care provider of a possible health status change (e.g., infection onset); also, consistent menstrual cycle biphasic temperature shifts may indicate ovulation in women.

Figure 5:
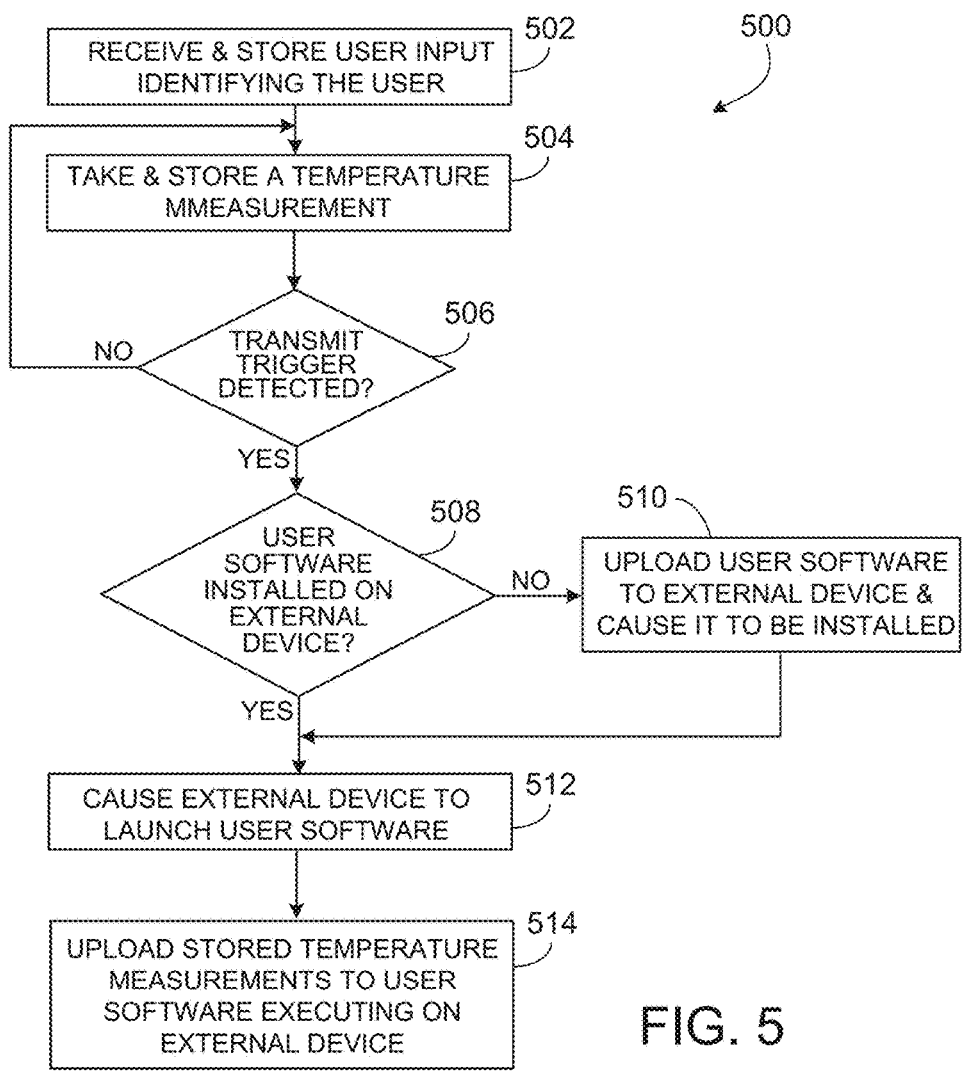
FIG. 5 is a flowchart of an example process of operation and use of an intelligent digital thermometer.

FIG. 5 is a flowchart of an example process 500 of operation and use of the digital thermometer. References below and throughout to the "thermometer" performing a function or operation should be understood as a shorthand for meaning that the thermometer's controller, based on the device software and potentially on information received from the user, is causing the function or operation to be performed, either alone or in conjunction with other components of the thermometer (e.g., temperature sensor, memory, timer, communications unit, I/O unit, etc.).

At 502, the thermometer receives user input via buttons or other user interface control on the housing of the thermometer (e.g., via touch screen controls), and stores the received information in the thermometer's memory. The received user input may include information that identifies the user, e.g., a unique code, a user ID, the user's name, user or patient health information, standard patient data or the like.

At 504, in response to some predetermined stimulus (e.g., button press by user, detection of heat greater than a threshold amount, passage of a predetermined period of time, etc.) the thermometer takes one or more temperature measurements and stores them in the thermometer's memory in a manner such that they are uniquely associated with the user identification information received in 502. As a result of storing temperature measurements in this manner (i.e., associated with a particular user), a single thermometer can be used with multiple different users, each of which would have an associated profile stored in the thermometer's memory. User profiles contain standard patient data including, for example, name, date of birth, ethnicity, smoking status, medications, laboratory tests, vital signs (e.g., height, weight, blood pressure, body mass index), procedures, sex, race, preferred language, problems, medication allergies, laboratory value(s)/result(s), care plan field(s), including goals and instructions, and care team members.

At 506, the thermometer determines whether a transmit trigger has been detected. A transmit trigger could be a predetermined event, or the concurrence of a combination of predetermined events. For example, a transmit trigger could be a detection by the thermometer that a communication link has been established between the thermometer and an external device (e.g., personal computer, server, mobile device, tablet, printer, network access device, etc.). The communication link could be either wired (e.g., via the thermometer's USB connector) or wireless (e.g., via the thermometer's WiFi, Bluetooth, or cellular communications units). Alternatively, the trigger condition may be set to require that only a specified communication link type (e.g. wired) qualifies as a trigger condition. That is, plugging the thermometer's USB connector into a USB receptacle on the external device would serve as a transmit trigger, but detecting that a wireless communication link had been established would not.

Moreover, the transmit trigger may require two or more conditions to be met, for example, not only a detection of a communications link with an external device, but also a detection that the user has provided user input (e.g., a button press) indicating that transmission of temperature measurements is desired, and/or a detection that a predetermined period of time had passed (e.g., a week or more) since the last transmission, and/or a detection that a predetermined number of temperature measurements corresponding to the identified user had yet to be transferred to any external device.

In any event, if a transmit trigger is not detected at 506, the flow returns to 504 to facilitate more temperature measurements, as desired. If a transmit trigger is detected at 506, the thermometer determines whether the user software stored in the thermometer's memory has or has not already been installed on the external device. The thermometer determines this information by communicating with the external device through an appropriate API (Application Programming Interface) and querying the external device whether the user software has been installed. If the user software has not been installed on the external device, then at 510 the thermometer uploads the user software to the external device and, via the API, causes it to be installed on the external device.

If the user software has already been installed on the user device, or if the user software is caused to be uploaded and installed at 510, then at 512 the thermometer, via the API, causes the external device to launch (i.e., begin executing) the installed user software. Execution of the user software may, for example, cause a graphical user interface (GUI) (e.g., a browser window) to appear on a display screen associated with the external device, which provides a user of the external device (who may or may not be the same as the user of the thermometer) with various GUI controls and options to control operation of the user software. For example, the available GUI controls may allow the user to view, graph, edit or otherwise manipulate temperature measurements previously uploaded to the external device. Additionally, the GUI allows data input, such as observational notes associated with the date on which temperature was recorded (observed or self-reported status of patient and/or patient environment during exam, physical signs of fertility such as cervical mucus presence, etc.). Data displayed and input via the thermometer software GUI may also be copied and pasted into other data management software programs (e.g., Microsoft Excel). The user software may also provide an automatic graphing function, with "automatic" meaning that graphing (either on a display screen or hard copy or both) occurs as soon as temperature measurement information is received from the thermometer, and without any user input or intervention required.

At 514, once the user software is determined to be executing on the external device, the thermometer uploads stored temperature measurements (and potentially other data such as timestamps, user identity, and the like) to the user software executing on the external device. As noted above, the executing user software may automatically process any newly received temperature measurements, for example, by graphing the measurements upon receipt and without requiring an instruction from the user to do so. In that scenario, the temperature taking and graphing functions appear to be wholly integrated and seamless from the user's perspective. That is, all the user needs to do is to operate the thermometer to take the desired number of temperature measurements, then plug the thermometer's USB connector into a USB receptacle of a computer or other external device, and then stand back and watch a graph of the temperature measurements pop up on the computer's screen and/or a printer associated with the computer. The device software executing on the thermometer, in cooperation with the user software that is uploaded to and installed on the external device, automatically handle all of the details necessary to make that happen in a manner that is opaque to the user.

Various implementations of the digital thermometer described here may include one or more of the following features, aspects and/or uses.

The digital thermometer can store large amounts of data (e.g., body temperature readings, date, time of reading, patient codes, etc.) for multiple patients (e.g., 10 or more) for long periods of time (e.g., up to a year). The sensor end (tip) of the device can be for oral or rectal insertion. Alternatively, axillary readings may be taken with the same sensor end; alternatively, an infrared auditory sensor end may be opted for. The end opposing the sensor end of the thermometer device can have a USB connector, enabling the device to communicate with a computer or hand-held device via USB port. Alternatively, the data may be transferred to a computer or hand-held device via wireless Bluetooth technology. An associated software program will automatically chart the temperature and time data on a graph, and/or present data onto a spreadsheet program.

The digital thermometer can be used to store large volumes of temperature measurements over time for patient vital signs monitoring in ambulatory or in-patient health care industries. This device will facilitate health care facilities to transition or maintain compliance with the 2014 Federal Electronic Medical Record mandate. This high data storage-capacity portable digital thermometer with a streamlined USB design enables health care providers to accurately measure and record multiple temperature data points each day over a period of many days. The data can then be uploaded onto a computer via the USB connector, or relayed to a computer immediately via wireless technology.

An additional model upgrade would be available that would enable input of data into the device, such as a patient code, automatically associating the temperature reading with a specific patient, and enabling the health care practitioner to monitor several patients' temperature data-sets on the same device. This model would also come with sterile sheaths for sanitary temperature readings for each patient. This model would also have an upgraded option to include a program that alerts the user of variant temperature readings, based on each patient's stored temperature record pattern.

The thermometer can be used for a Natural Family Planning Method of fertility assessment through the evaluation of a woman's basal body temperature pattern and shifts throughout her menstrual cycle. The accuracy of basal body temperature measurements are affected by many variables including the time of day measurements are taken, human error, individual variation, length and quality of sleep, and illness, among other factors. This tool helps to increase the accuracy of basal body temperature measurements by decreasing the variable of human error during temperature reading recording, and by alerting the user to take her temperature at a set time each morning with a pre-set alarm. This information can then be evaluated with the woman's health care practitioner as an aid in fertility healthcare management.

The thermometer may include an alarm clock function that will assist the woman in accurate basal body temperature readings each day. For each temperature measurement recorded, the date and time the measurement was taken are also recorded. When the information is intended for use in creating a woman's menstrual cycle record, the associated computer software graphing program, will automatically discard erroneous data points such as temperature measurements taken at a time inconsistent with the set alarm time. Upon startup, the computer software program will initiate the user to input personal data into the system such as the date of the first day of her menstrual cycle for each cycle recorded. The system will then automatically chart the temperature data points on a graph (e.g., Temperature over Time).

The thermometer may be used to measure and record temperature data for average consumer home-use. Functions may include a rechargeable battery, and the ability to transfer digital data to a health care practitioner electronically. Other general features may include back-light for viewing temperature reading in the dark, audible temperature reading for users who are seeing-impaired, alarm, battery life indicator/alert for low battery life, and/or a mini-digital menstrual cycle chart displayed on the thermometer itself for instant viewing (e.g., daily basal body temperature readings are displayed as a line graph, plotted as Temperature over Time).

The thermometer optionally may include a camera, thereby enabling a caregiver or other user to capture and transmit images and video of their patients directly from the thermometer to an external device.

Figure 6:
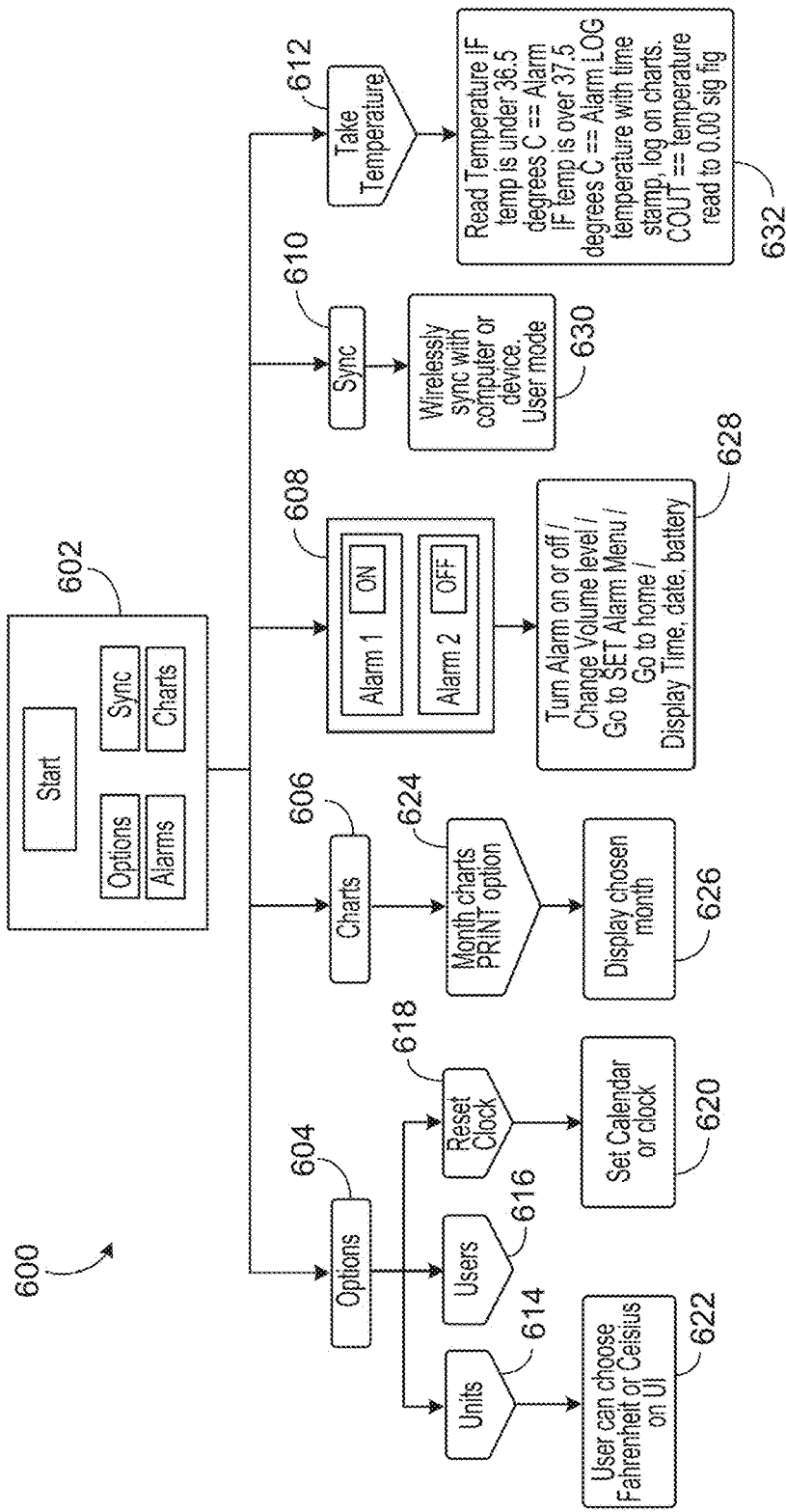
FIG. 6 is user interface map showing user interface options of an intelligent digital thermometer.

FIG. 6 is user interface map 600 showing user interface options, and corresponding functions, of an intelligent digital thermometer. The user interface can be implemented either as physical controls or as a virtual touch screen in which varying controls can be displayed on the screen as appropriate for the context. As shown therein, a home screen 602 includes user selectable icons corresponding to five different functions. If the user selects the "Start" icon in the home screen 602, doing so causes the digital thermometer to take one or more temperature measurements at 612 and 632. If the user selects the "Sync" icon, doing so causes the digital thermometer at 610 and 630 to synchronize temperature measurements and other information, e.g., either by wirelessly communicating with a computer or other external device or by communicating via a wired data connector such as a USB port.

If, at the home screen 602, the user selects the "Alarms" icon, doing so causes the user interface display to change to the alarms screen 608, which provides the user with access to two different alarms that can be independently manipulated as desired at 628, e.g., to turn them on/off, change the volume level, go to a "Set Alarm" sub-menu, etc. In general, the user typically sets an alarm to remind the user to take a temperature measurement at a specified time.

If, at home screen 602, the user selects the "Charts" icon, doing so provides the user with access to temperature charting functionality at 606, 624 and 626, such as printing or displaying charts of the user's temperature measurements for a chosen month.

If, at home screen 602, the user selects the "Options" icon, doing so provides the user with access to various other functionalities 604 such as changing units between Fahrenheit and Celsius 614, 622, reviewing or editing information relating to the user's identity 616, and setting the calendar and clock 618, 620.

Figure 7A:
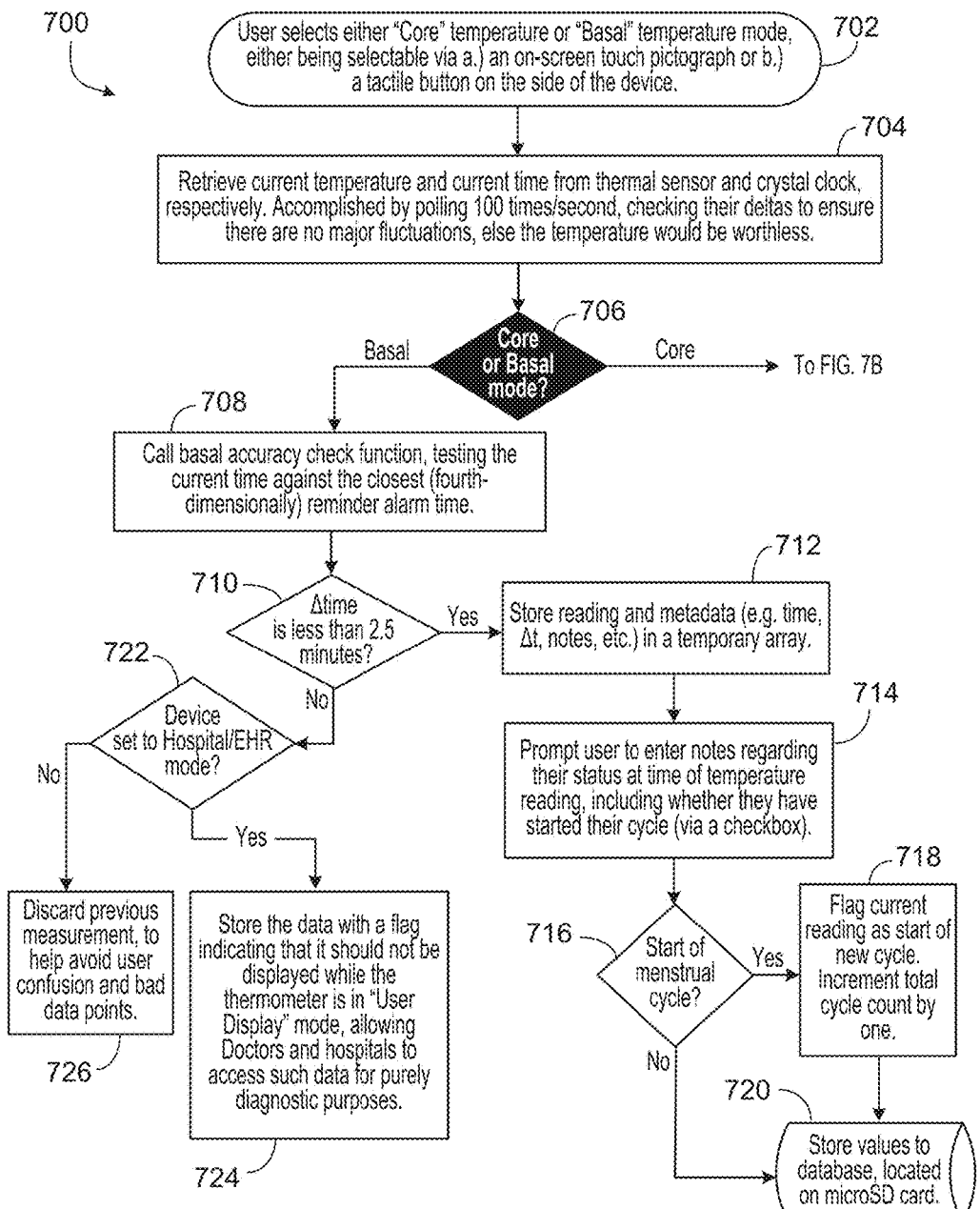
FIGS. 7A and 7B together are a flowchart showing processes performed by an intelligent digital thermometer.
Figure 7B:
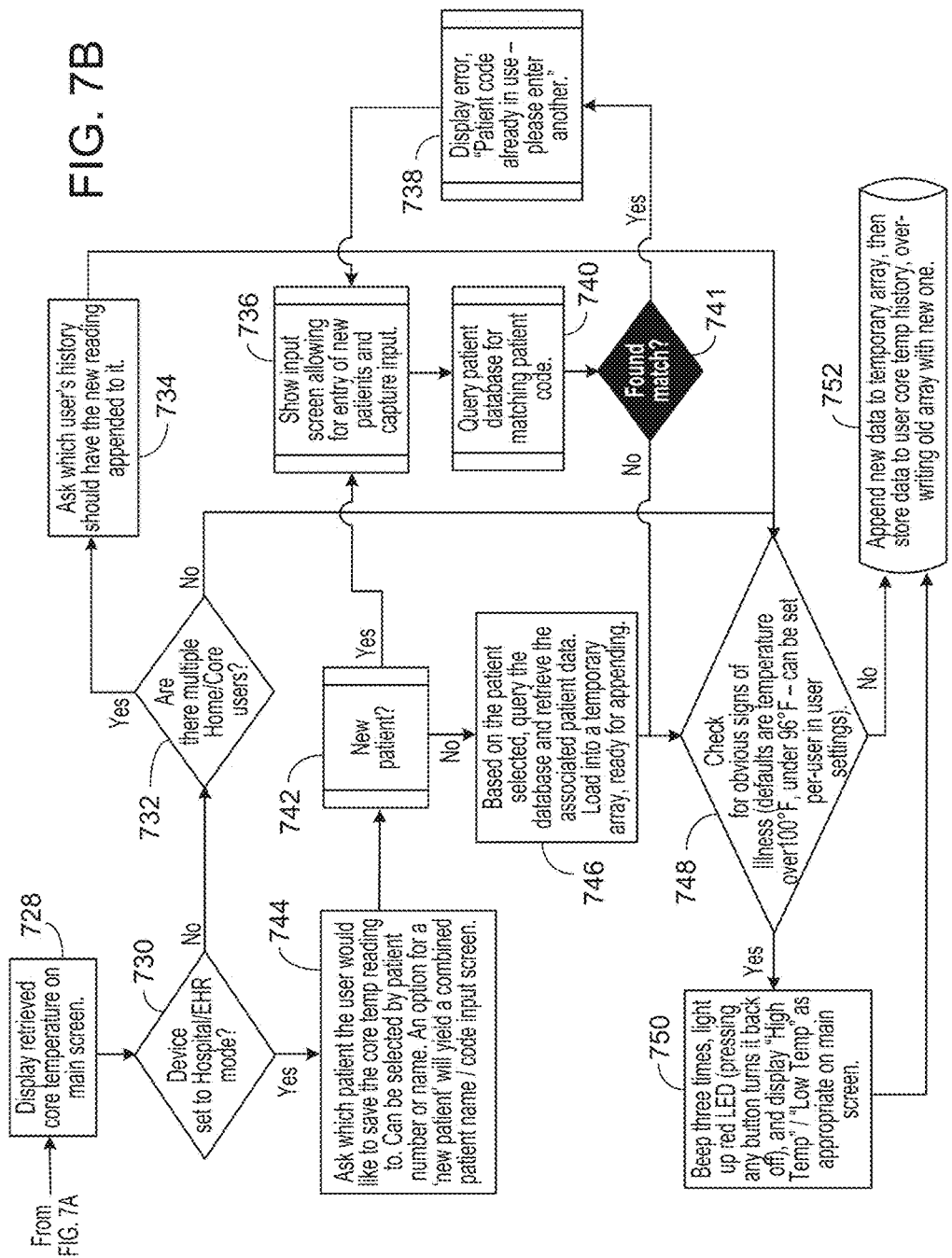

FIGS. 7A and 7B together are a flowchart showing a process 700 performed by an intelligent digital thermometer. As shown therein, at 702 the process 700 receives input from a user (via either a touch screen icon or a tactile button) specifying an operating mode of the digital thermometer, specifically, either a "basal mode" or a "core mode." Basal mode is selected, for example, when the user has first woken up in the morning and before getting out of bed or exerting any energy that could elevate the user's basal body temperature. Core mode is selected for all other temperature measurements.

At 704, the process 700 receives the current temperature from the thermometer's thermal sensor and the current time from the thermometer's clock. This may be accomplished, e.g., by polling those thermal sensor 100 times/second, and determining whether any major fluctuations exist between the readings, the presence of which could indicate erroneous temperature data.

At 706, the process 700 determines whether the user has selected basal mode or core mode. If the process 700 determines that the user has selected basal mode, then the operations at 708-726 are selectively performed, as follows:

At 708, a basal accuracy check is performed by calculating a difference between a current time and a closest reminder alarm time, and determining (at 710) whether the calculated difference is less than a predetermined value (e.g., 2.5 minutes). If the calculated time difference is not less than the predetermined value, then at 722, the process 700 determines whether or not the thermometer is set to "Hospital/EHR mode." If the thermometer is not set to Hospital/HER mode, then at 726 the process 700 discards the previous measurement to help avoid user confusion and bad data points. If the thermometer is however set to Hospital/HER mode, then at 724, the temperature data is stored with a flag indicating that it should not be displayed while the thermometer is in "User Display" mode, thereby allowing caregivers and hospitals to access such data for diagnostic purposes.

If at 710 the calculated time difference is determined to be less than the predetermined value, then at 712 the temperature measurement and metadata (e.g., time, delta T, notes, etc.) are stored in a temporary array.

At 714, the process 700 prompts the user to enter notes regarding her status at the time of the temperature measurement, including whether she has started her menstrual cycle.

If the user has started her menstrual cycle (as determined at 716), then at 718 a flag is set to indicate that the current temperature measurement corresponds to a new menstrual cycle, and the total cycle count is incremented by one. Then at 720 the process 700 stores temperature values and other information to a database or other memory. If the user has not started her menstrual cycle (as determined at 716), then the process 700 skips step 718.

If, at 706, the process 700 determines that the user has selected core mode, then the operations at 728-752 are selectively performed, as follows, not necessarily in the listed or numerical order (i.e., the logical order of operations is specified in FIGS. 7A and 7B):

At 728, the core temperature is displayed on the thermometer's main screen.

At 730, the process 700 determines whether or not the thermometer is set to Hospital/EHR mode.

At 732, the process 700 determines whether multiple user profiles currently exist in the thermometer's memory.

At 734, the process 700 prompt the user to enter information specifying which user's history (i.e., profile) should have the new temperature reading appended to it.

At 736, the process 700 causes an input screen to be displayed to the user that allows for entry of new patients and related information.

At 738, the process 700 causes the following error message to be displayed: "Patient code already in use—please enter another."

At 740, the process 700 queries the patient database to search for a matching patient code.

At 741, the process 700 determines whether a match has been found as a result of the query performed at 740.

At 742, the process 700 determines whether the user entered information corresponds to a new patient.

At 744, the process 700 prompts the user to enter information specifying to which patient profile the current core temperature reading should be saved. The entered information can be either in the form of a name or a patient number, or an indication that a new patient profile should be created.

At 746, based on a selected patient, the process 700 queries the database to retrieve the associated patient data, which is loaded into a temporary array.

At 748, the process 700 checks for obvious signs of illness, e.g., temperatures over 100 degrees Fahrenheit or under 96 degrees Fahrenheit. These temperature values can either be default values or can be customized to individual users.

At 750, the process 700 causes the thermometer to beep three times, light up a red LED, and display either "High Temp" or "Low Temp" as appropriate on the thermometer's main screen.

At 752, the process 700 appends new data to the temporary array, then stores the data to the user's core temperature history, over-writing the old array with the new one.

A number of implementations have been described. Nevertheless, it will be understood that various modifications may be made without departing from the spirit and scope of the claims.

What is claimed is:

1. A digital thermometer comprising:
   a housing having a tip configured to be placed at a location on a human body at which a temperature measurement is to be taken;
   a user interface control disposed on the housing and operable to receive input from a user of the digital thermometer, the user interface control including a button that, when pressed, enables a user to switch between a basal mode and a core mode, and controls to enable the user to input one or more reminder alarm times and to enable the user to input user information indicating that the user has started her menstrual cycle;
   a display disposed on the housing and configured to display information, including temperature measurements, to the user of the digital thermometer;
   a data connector disposed on the housing and configured for insertion into a compatible data port on an external device;
   a communications unit disposed within the housing and configured to enable wired or wireless communication between the digital thermometer and the external device;
   a temperature sensor disposed within the housing and configure to take temperature measurements at the tip of the housing;
   a clock to keep track of a current time;
   memory, disposed within the housing, storing device software and configured to store additional information including temperature measurements, wherein the device software comprises instructions relating to control of the thermometer;
   a controller, disposed within the housing, configured to control operation of the digital thermometer based on the device software stored in the memory and input received from the user of the digital thermometer, wherein execution of the device software by the controller causes the controller to perform operations including:
   receive one or more temperature measurements from the temperature sensor;
   store the received temperature measurements in the memory;
   detect a trigger condition to transmit the temperature measurements to an external device; cause user software to begin executing on the external device;
   upload the stored temperature measurements to the external device, wherein the external device is configured to automatically generate a biphasic body temperature chart in response to receiving the temperature measurements;
   determine an operating mode of the digital thermometer based on a state of the user interface control button, the operating mode being either the basal mode or the core mode;
   if the operating mode is determined to be the basal mode then the controller performs operations including:
      perform a basal accuracy check (BAC) by (i) calculating a difference between the current time (CT) and a closest reminder alarm time (CRAT) that is closest to the CT, and (ii) determining that the calculated difference is less than or equal to a predetermined number of minutes (M) before or after the CRAT through performance of an equation stored in the memory $BAC \leq M \pm (CT - CRAT)$;
      receive, via the user interface control, user information indicating that the user has started her menstrual cycle;
      associate, based on user information received via the user input control, a current temperature measurement with a start of a new menstrual cycle;
      determine that all subsequent basal mode temperature measurements that pass the BAC correspond to a new menstrual cycle; and
      store the current temperature measurement and information relating to the association in the memory; and
   if the operating mode is determined to be the core mode then the controller displays a measured temperature in the display of the digital thermometer.

* * * * *